July 15, 1930.　　　D. L. BASS　　　1,770,832
SURGICAL APPLIANCE
Original Filed May 19, 1928　　2 Sheets-Sheet 1
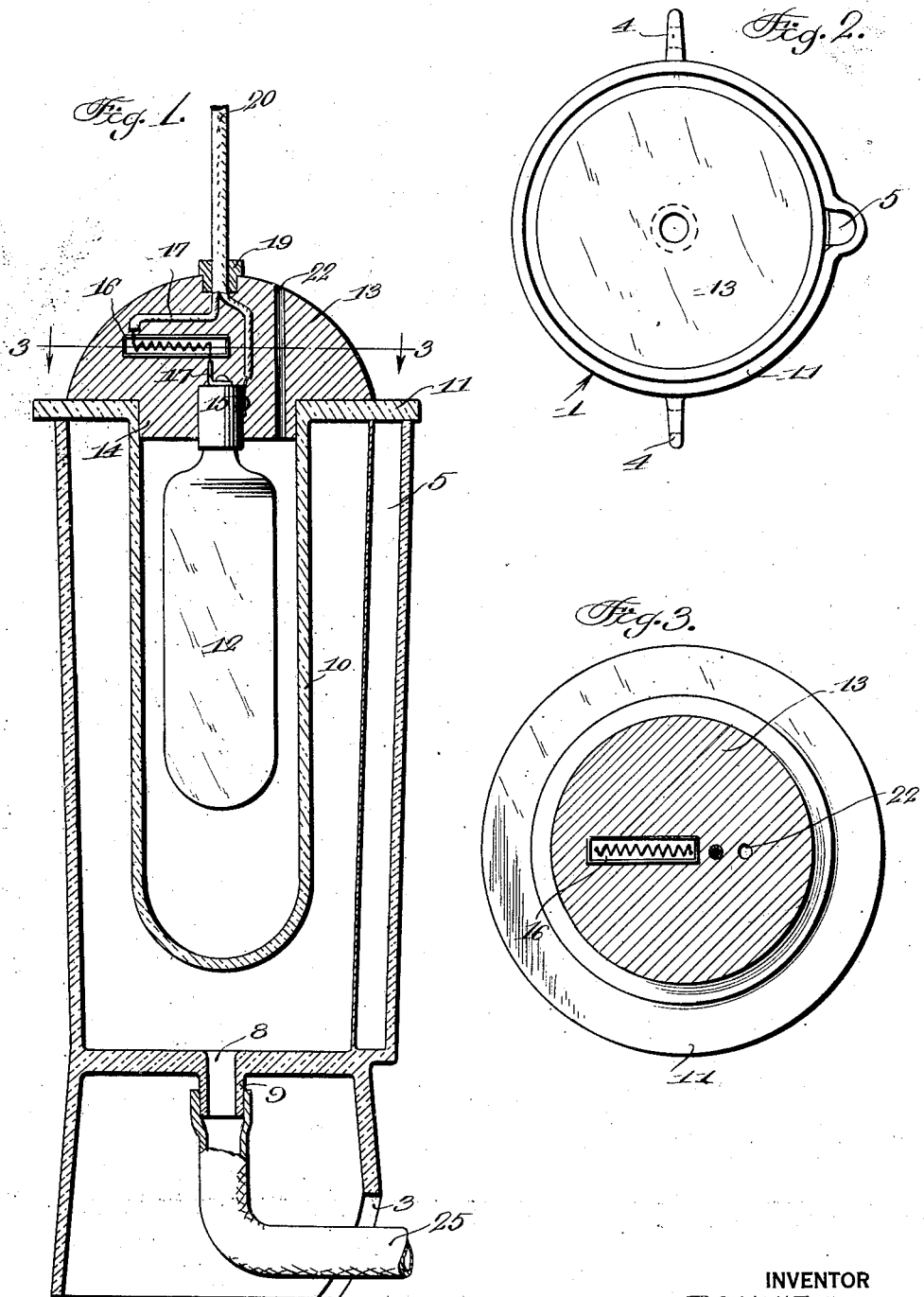
INVENTOR
DONNIE L. BASS
BY
ATTORNEY July 15, 1930.  D. L. BASS  1,770,832
SURGICAL APPLIANCE
Original Filed May 19, 1928  2 Sheets-Sheet 2

INVENTOR
DONNIE L. BASS
BY
ATTORNEY

Patented July 15, 1930

1,770,832

UNITED STATES PATENT OFFICE

DONNIE L. BASS, OF ASHEVILLE, NORTH CAROLINA, ASSIGNOR OF ONE-FOURTH TO CLYDE H. SMITH AND ONE-FOURTH TO JAMES S. HOWELL, BOTH OF ASHEVILLE, NORTH CAROLINA

SURGICAL APPLIANCE

Application filed May 19, 1928, Serial No. 279,100. Renewed May 22, 1930.

This invention relates to surgical appliances and a primary object thereof is to provide a device by means of which a constant temperature may be maintained for use in connection with solutions designed for various medicinal uses, such as "the Murphy drip," intravenous injections, saline and other solutions, as well as for solutions used in feeding the human body and for blood transfusions.

Another object of the invention is to provide a device of this character which is simple in construction, and efficient in operation, and which may be readily disassembled for cleaning.

In carrying out these objects, the invention is susceptible of a wide range of modifications without departing from the spirit or sacrificing any of the advantages of the claimed invention, there being shown in the drawings for illustrative purposes a preferred and practical form in which;

Figure 1 represents a vertical section of the device constituting this invention;

Fig. 2 is a top plan view thereof;

Fig. 3 is a transverse section taken on the line 3—3 of Fig. 1, and

Figure 4:
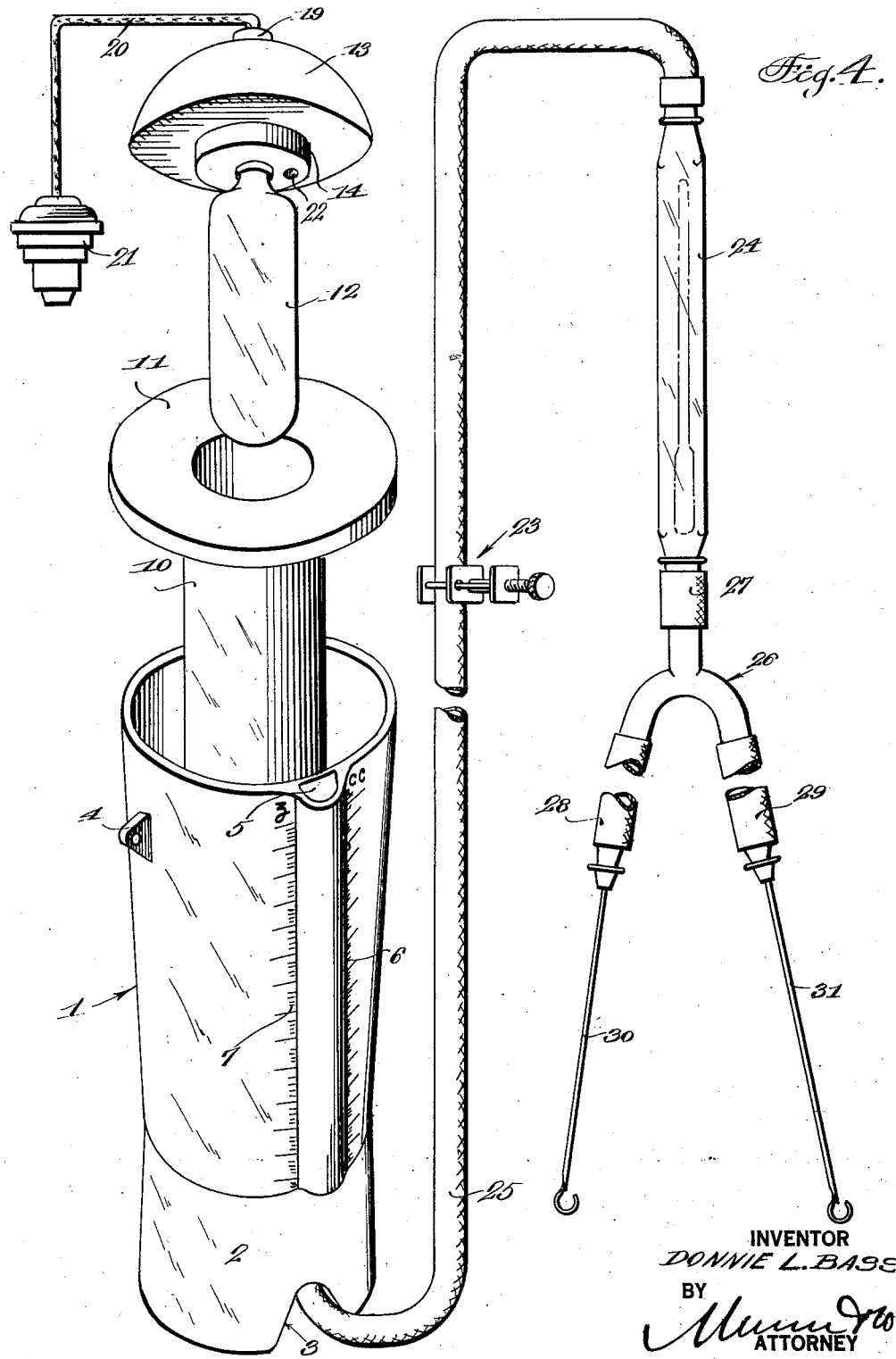
Fig. 4 is a perspective group view with the parts slightly separated and arranged in juxtaposition ready for assembling, parts of the tube being broken out for convenience in illustration.

In the embodiment illustrated, an infusion jar or container 1 is shown constructed of glass, preferably of "pyrex" to adapt it to withstand changes in temperature without breaking. This container 1 has a base 2 preferably flared and made integral with the container body and in one side wall of which is formed an opening 3 for the passage of the tube 25 to be used in connection with the device, and which will be more fully hereinafter described.

The container 1 is preferably provided near its upper end with laterally projecting apertured ears 4 made integral with the body and which are designed to receive a bail handle, not shown.

Arranged longitudinally on the container 1 is a pocket 5 to hold an ordinary clinical thermometer, not shown, the inner wall of said pocket being of thin glass, which while protecting the thermometer from the contents of the container 1 will yet expose it for contact through the wall 5 with the contents to disclose the temperature of said contents. A series of graduations 6 are arranged along the right side of the pocket 5 as shown in Fig. 4, and are designed to indicate cubic centimeters, while at the left hand side is another scale indicating fluid ounces.

The bottom of the container 1 has a central opening 8 which is surrounded on the lower face of said bottom by a collar or nipple 9 over which one end of the tubing 25 is designed to fit, as is shown clearly in Fig. 1. As will be seen from Fig. 1, the container 1, base 2, projections 4 and collar 9 are all cast in a single piece.

Supported in the container 1 is a heating element protector 10 in the form of a glass bulb or tube about 2½" long or less, closed at its lower end and rounded as shown clearly in Fig. 1, while at its upper end it is open and provided with an annular plate-like collar 11 which is designed to extend over the upper edge of the container 1 and rest thereon, thereby supporting the protector within the container.

The collar 11 is preferably made of heavier glass than the body of the protector 10, and is ground on its lower face to adapt it to fit tightly on the upper edge of the container 1. Designed to be mounted in the protector 10 is a heating element 12 which is carried by a cap or plug 13 composed of suitable nonconductive material, and which has on its lower face a reduced extension 14 of a size to fit snugly in the upper end of the protector 10. An electric socket or terminal 15 has a tight slip fit in the cap 13, as shown clearly in Fig. 1, and which carries the heating element proper 12, which is here shown in the form of a long electric light bulb preferably of ten watts, although obviously, it may be more if found necessary. A rheostat 16 preferably located within the cap 13 is designed for reducing the ordinary 110 V. circuit to produce 110° F. The wires 17 and 18 of an ordinary electric circuit are connected with the socket member 15 and the rheostat 16 is located in the wire 17, as shown clearly in Fig. 1. A bushing 19 surrounds the conductor wire casing 20 in which is located the two wires 17 and 18, and at the opposite end of which is provided an electric plug 21 for connection with an ordinary type of lighting socket. A ventilating opening 22 extends through the cap 13 as shown in Fig. 1 and is designed for ventilation of the protector tube 10.

The rubber tube 25 which is connected at one end with the collar or nipple 9 of the container 1 is provided with the usual controlling clamp 23 for regulating the flow of fluid through the tube.

The tubing 25 has preferably located therein an ordinary glass tubing 24 containing a clinical thermometer for use in applying drip solution not necessarily completely sterile.

A Y 26 of glass tubing is connected with the tube 24 by a piece of rubber tubing 27, as shown clearly in Fig. 4, and this Y 26 carries branch tubes 28 and 29.

Intravenous injection needles 30 and 31 are carried by the tubes 28 and 29, it being of course understood that these needles are employed only when injections are to be made within a vein.

From the above description, it will be obvious that the fluid to be warmed is placed within the container 1, the clamp 23 having first been adjusted to shut off flow through the tube 25. After the solution or liquid has been placed within this container, the protector 10 carrying the heater 12 and cap 13 are inserted within the container and the electricity turned on so that the heat from the heating element 12 will pass through the protector 10 into the body of the solution and warm it to the desired degree which will be indicated by the thermometer located within the pocket 5 outside the container.

By constructing this device in the manner above described, with the flared base 2, the container 1 may be readily supported on any suitable surface, and leave the hands of the operator free to manipulate the tube 25 for using the solution from the container in any manner desired. While intravenous injection needles are here shown in connection with the apparatus, it is, of course, to be understood that they may be substituted by any suitable means for utilizing the fluid from the container 1 according to the manner in which it is to be used.

Moreover, by making the device of glass entirely throughout, the contents will be readily visible so that the quantity within the container may be readily determined, by an inspection of the scales 6 and 7.

I claim:—

1. A surgical appliance comprising a fluid container having an outlet, an inner container supported within said first mentioned container, a heating element mounted in said inner container, said inner container having means for closing the upper end of the outer container and for supporting the inner container in operative position.

2. A surgical appliance comprising a fluid container having an outlet, a thermometer pocket mounted in one side wall of said container, an inner container supported within said first mentioned container, a heating element mounted in said inner container, said inner container having means for closing the upper end of the outer container and for supporting the inner container in operative position.

3. A device of the class described comprising a container having an outlet in its bottom and provided with a depending base surrounding said outlet, said base having an opening in one side wall for the passage of a tube therethrough, a thermometer pocket extending longitudinally of said container and having a thin inner wall arranged between it and the container, an inner container having a closed bottom and an annular flange at its upper end adapted to engage the upper edge of the outer container and support the inner container therein, a stopper for said inner container having a heating element depending therefrom and depending into the inner container whereby it is supported and protected from the contents of the outer container.

Signed at Morganton in the county of Burke, and State of N. Carolina this 11th day of May, A. D. 1928.

DONNIE L. BASS.